US006619243B2

United States Patent
Al-Hawaj

(10) Patent No.: US 6,619,243 B2
(45) Date of Patent: Sep. 16, 2003

(54) PIVOTING PISTON ROTARY POWER DEVICE

(76) Inventor: Osama M. Al-Hawaj, P.O. Box 15462, Daiyah (KW), 35455

( * ) Notice: Subject to any disclaimer, the term of this patent is extended or adjusted under 35 U.S.C. 154(b) by 39 days.

(21) Appl. No.: 10/052,187

(22) Filed: Jan. 17, 2002

(65) Prior Publication Data

US 2003/0131808 A1 Jul. 17, 2003

(51) Int. Cl.[7] ............................................. F02B 59/00
(52) U.S. Cl. .................. 123/44 B; 123/43 C; 417/462; 91/492
(58) Field of Search .............................. 123/44 B, 43 C; 417/462; 91/492

(56) References Cited

U.S. PATENT DOCUMENTS

| | | | |
|---|---|---|---|
| 3,438,358 A | * 4/1969 | Porsch et al. | 123/241 |
| 3,788,286 A |   1/1974 | Brewer | |
| 3,923,013 A | * 12/1975 | Myers | 123/241 |
| 3,927,647 A | * 12/1975 | Blackwood | 123/43 C |
| 3,986,483 A | 10/1976 | Larson | |
| 4,038,948 A |   8/1977 | Blackwood | |
| 4,109,618 A | * 8/1978 | Daniels | 123/43 C |

\* cited by examiner

*Primary Examiner*—Charles G. Freay
*Assistant Examiner*—William H. Rodriguez
(74) *Attorney, Agent, or Firm*—David Kiewit

(57) ABSTRACT

A rotary power device of the swinging piston type comprises a cylindrical rotor mounted between internal and external portions of a stator. The internal portion of the stator provides intake and exhaust channels and may hold an igniter. The external portion of the stator includes a middle portion with an oval cam track. The rotor includes a multiplicity of sector-shaped compartments arranged at equal angular intervals around the inner stator. Each compartment is open at the periphery of the rotor and has an inner opening to the central bore in alignment with ports in the central internal stator. A sector-shaped piston is mounted in each compartment for pivotal motion about a pivot axis at one vertex of the compartment. Each piston includes a roller follower for engaging the oval-shaped cam track as the rotor rotates, which causes angular reciprocation of the pistons within the compartments while performing intake and exhaust cycles through inner openings. The rotary power device may be modified to serve as an internal combustion engine, a compressor, a pump, or a hydraulic motor by replacement or modification of the central internal stator.

18 Claims, 12 Drawing Sheets

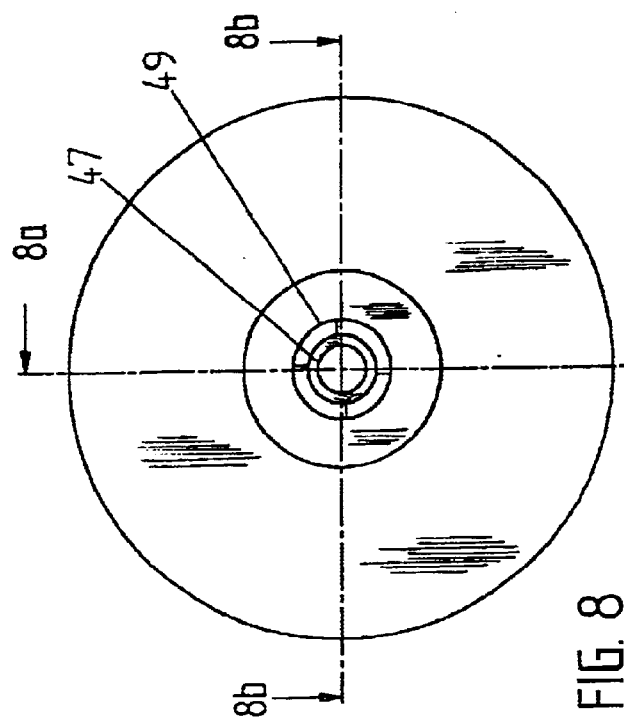
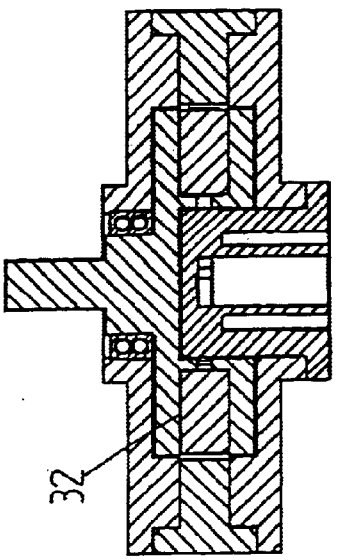
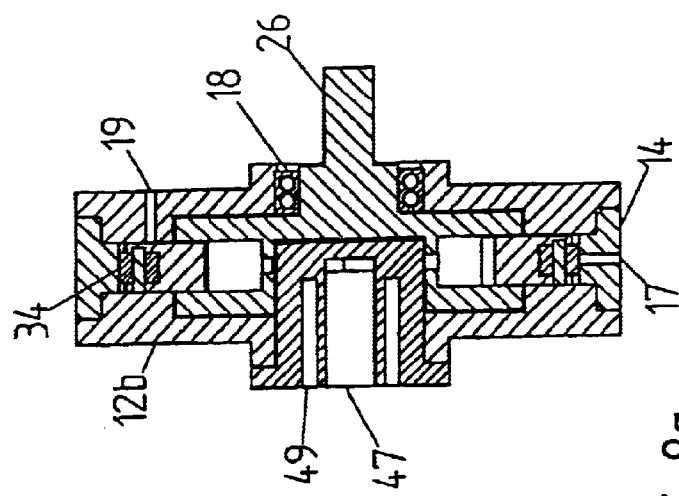
FIG. 8
FIG. 8b
FIG. 8a

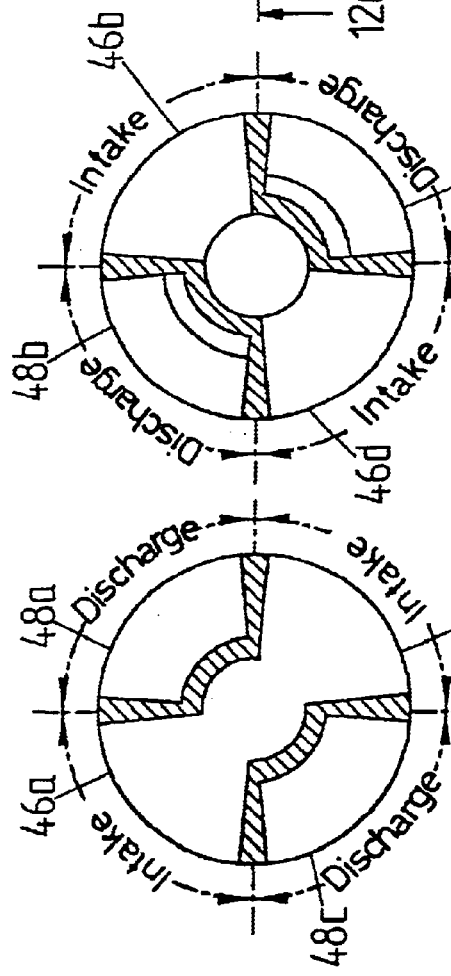
FIG. 12
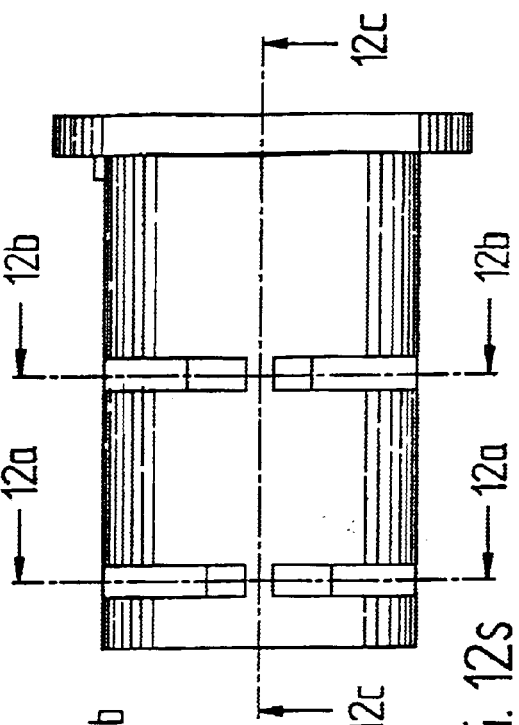
FIG. 12c
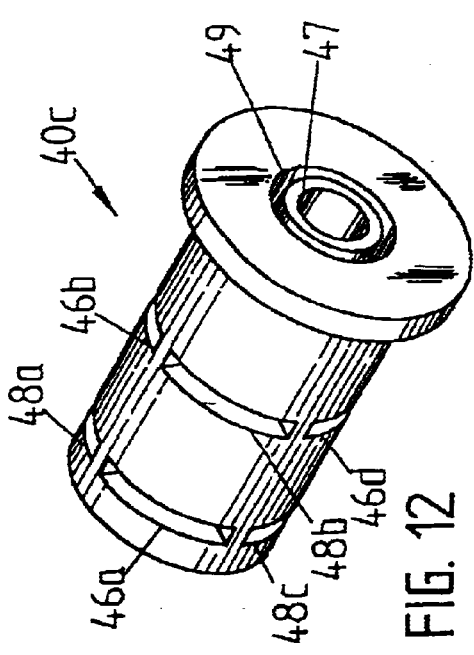
FIG. 12b
FIG. 12a

PIVOTING PISTON ROTARY POWER DEVICE

CROSS REFERENCE TO RELATED APPLICATIONS

Not Applicable

BACKGROUND OF THE INVENTION

1. Field of the Invention

The invention relates to rotary power devices, and more particularly to internal combustion engines, pumps, compressors, fluid-driven motors, and throttling devices in which the rotor includes at least two diametrically opposed pivoting pistons.

2. Background Information

This invention relates to a rotary power device with pivotable swingable pistons, such devices are characterized in having pistons or vanes that execute angular reciprocating movement within chambers in a rotating member and that engage a cam track. Examples of rotary devices of the above type can be found in U.S. Pat. No. 4,038,948 to Blackwood, U.S. Pat. No. 3,986,483 to Larson, and U.S. Pat. No. 3,788,286 to Brewer. These types of devices can function as internal combustion engines in which gas is initially entrapped within a rotor chamber as a piston swings outward towards a cam surface receding from the rotor and is then compressed when the piston swings inward as the cam surface approaches the rotor. The compressed gases ignite at minimum volume and the ignited gases exert a force on the outwardly swinging piston which, in turn, exert a force through roller cam followers on the relatively inclined cam track, the reaction to which provides the necessary torque to rotate the rotor Although such power devices have been proven to be theoretically functional, they characterized in some respects with complexities associated with cam arrangement, piston shape, and inlet and outlet arrangements, all of which make them costly to manufacture, assemble, and maintain.

BRIEF SUMMARY OF THE INVENTION

A pivoting piston rotary power device of the invention comprises a stator and a rotor. The preferred stator includes a tubular external stator portion defining an internal volume having an elliptical cross-section and formed by a combination of tubular middle portion, a front end portion and a back end portion. The front end portion has a central throughhole for receiving a shaft and the tubular middle portion has at least one elliptical cam track disposed on its inner surface. There is also an internal cylindrical stator portion projecting from the back end wall portion into the internal volume along an axis of the device. The preferred internal stator portion has a plurality of passageways formed in it, each of which comprises a channel parallel to the axis that communicates with at least one respective radial port formed in a periphery of the internal stator. The rotor comprises a shaft that extends along the axis of the device and that is journaled within the central throughhole in the front end portion of the stator. The rotor also comprises a cylindrical block having a central cylindrical bore for receiving the internal stator. The block is rotatable within that portion of the internal volume lying between the internal stator portion and the external stator portion. The block further comprises at least one circular array of a selected number of working compartments equi-angularly spaced apart about the axis of the device, each of the working compartments define a respective sector of a respective cylinder having a respective cylinder axis disposed parallel to the axis of the device. Moreover, each compartment is open to the peripheral surface of the block and has a radially inwardly directed opening that communicates with the central cylindrical bore. In addition, the device comprises the selected number of pivoting piston assemblies, each of which is received in a respective working compartment and each of which has a respective pivot axis coinciding with the respective cylinder axis of the working compartment in which it is received. Each piston assembly also comprises a roller cam follower for engaging a cam track on the inner wall of the middle portion of the external stator.

One object of the present invention is to provide an improved swinging piston rotary power device that can overcome the problems presently encountered in such class of rotary engines.

Another object of the invention is to provide a rotary power device light in weight, small in size and having a minimum number of parts.

Another object of the invention is to provide a family of rotary power devices that can be easily converted from one type to another, such as a pump, compressor, hydraulic motor, fluid driven pump or compressor, by a simple modification or replacement of a central stationary member and/or cam.

Another object of the invention is to provide a rotary power device characterized by reduced noise and vibration.

These and other objects and advantages of the present invention will be apparent from the following detailed description and the appended claims.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

FIG. 4a is a side elevation view of the rotary power device of FIG. 2.

FIG. 4b is a sectional view taken along line 4b—4b of FIG. 4a.

FIG. 7b is a sectional view taken along line 7b—7b of FIG. 7a.

FIG. 8 is an end view of a rotary power device of the invention employing the internal stator of FIG. 6.

FIG. 8a is a sectional view taken along line 8a—8a of FIG. 8.

FIG. 8b is a sectional view taken along line 8b—8b of FIG. 8.

FIG. 11s is a side elevation view of the apparatus of FIG. 11.

FIG. 11a is a sectional view taken along line 11a—11a of FIG. 11s.

FIG. 11b is a sectional view taken along line 11b—11b of FIG. 11s.

FIG. 11c is a sectional view taken along line 11c—11c of FIG. 11s.

FIG. 12 is an isometric view of an alternative internal stator of a rotary power device of the invention operable as a pump, compressor, expander device or fluid driven motor that employs the alternative rotor-piston assembly of FIG. 10 and the alternative cam of FIG. 9.

FIG. 12s is a side elevation view of FIG. 12.

FIG. 12a is a sectional view taken along line 12a—12a of FIG. 12s.

FIG. 12b is a sectional view taken along line 12b—12b of FIG. 12s.

FIG. 12c is a sectional view taken along line 12c—12c of FIG. 12s.

DETAILED DESCRIPTION OF THE INVENTION

Figure 1:
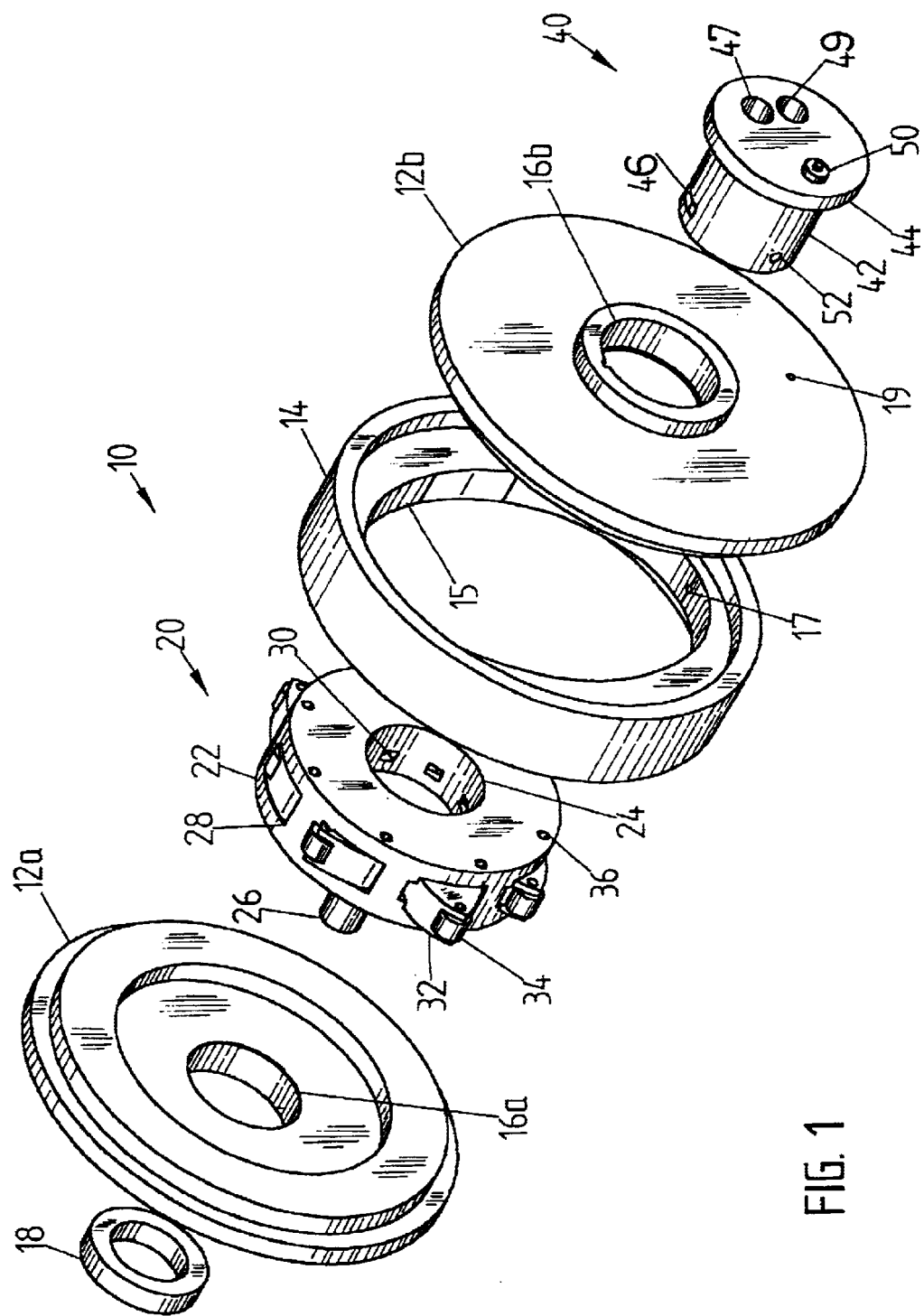
FIG. 1 is an exploded isometric view of the rotary power device.
Figure 2:
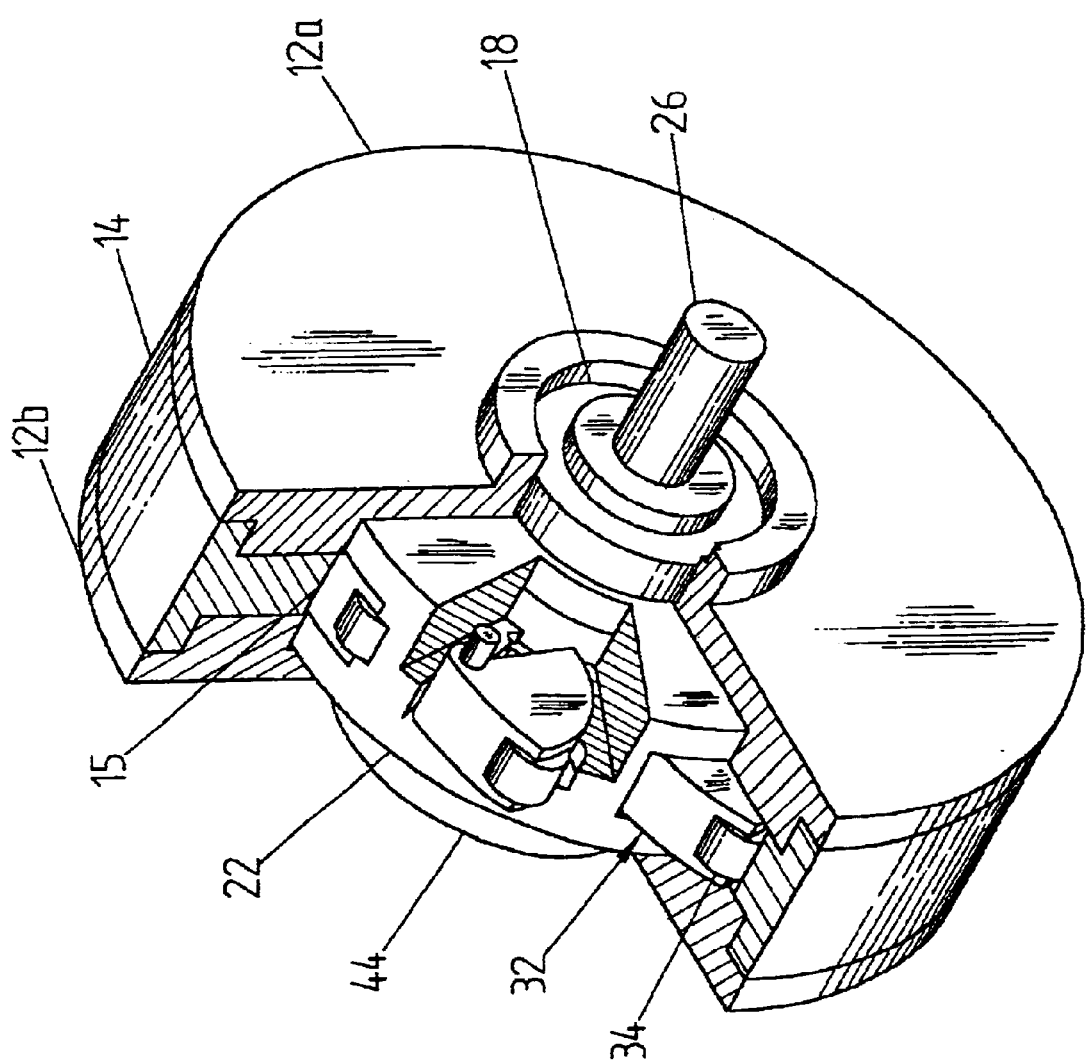
FIG. 2 is an isometric view of the rotary power device having portions of the outer housing, cams, and rotor cut away for purposes of illustration.
Figure 3:
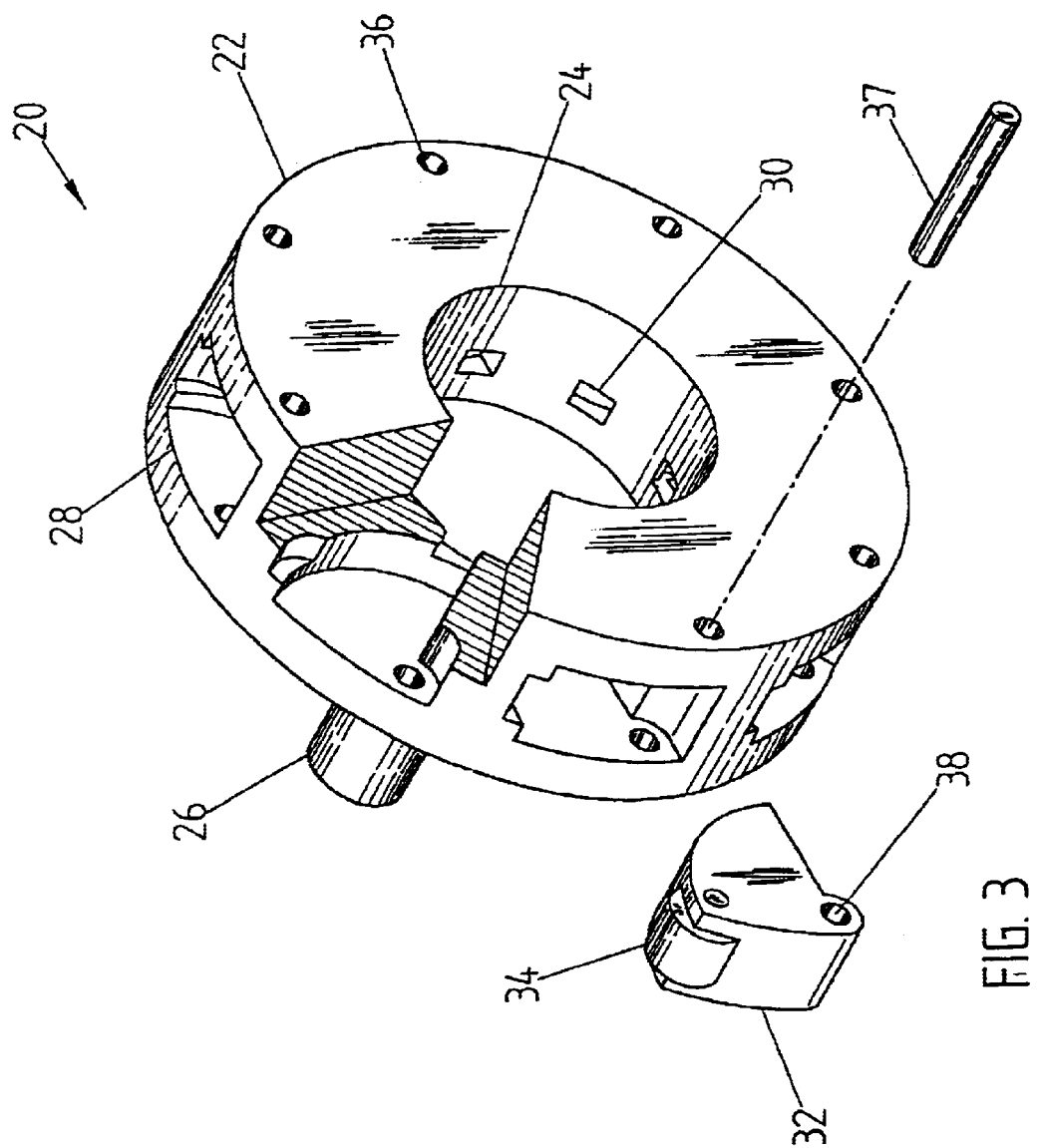
FIG. 3 is an exploded isometric view of the rotor-piston assembly with a portion cut away for purposes of illustration.
Figure 4:
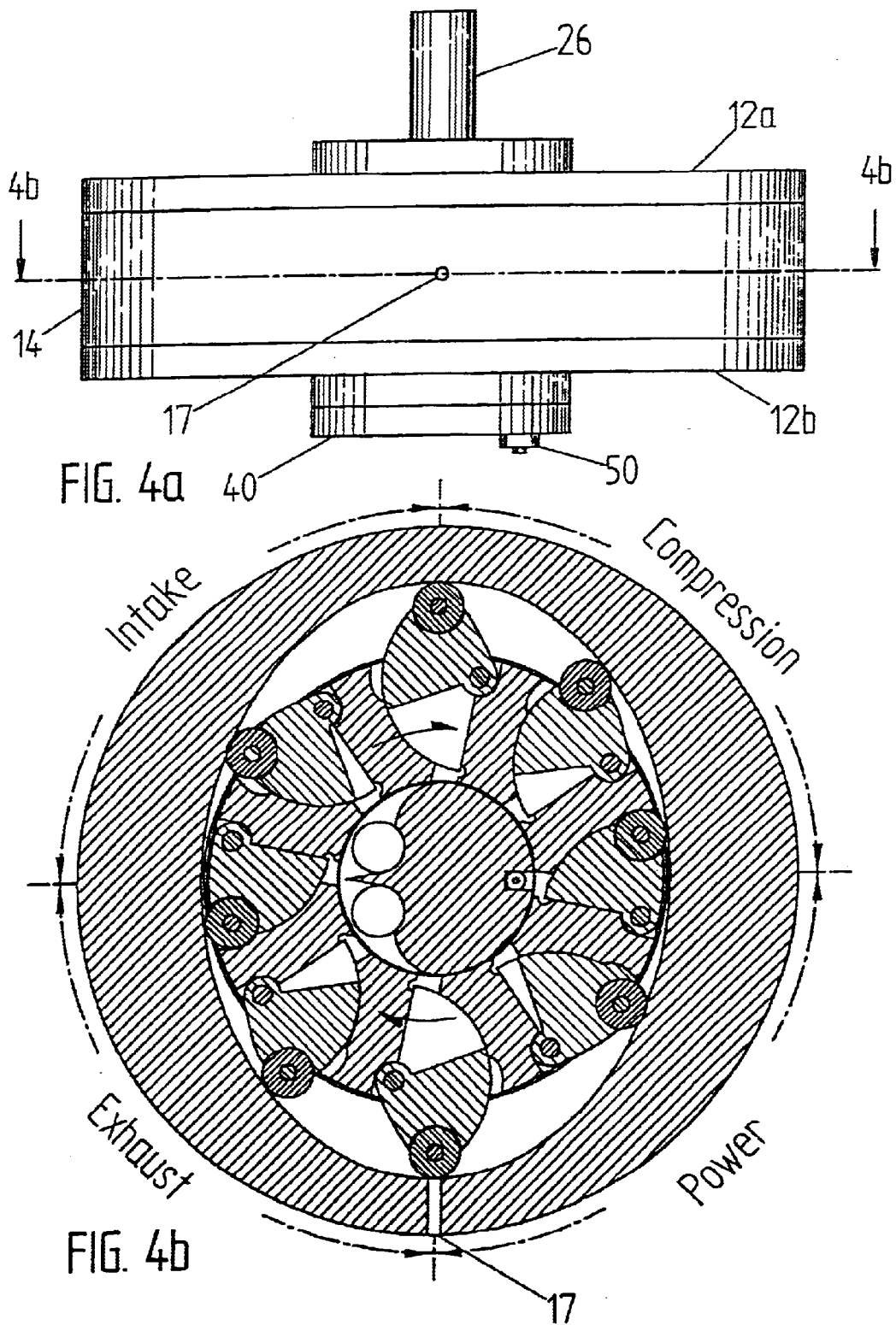
Figure 5:
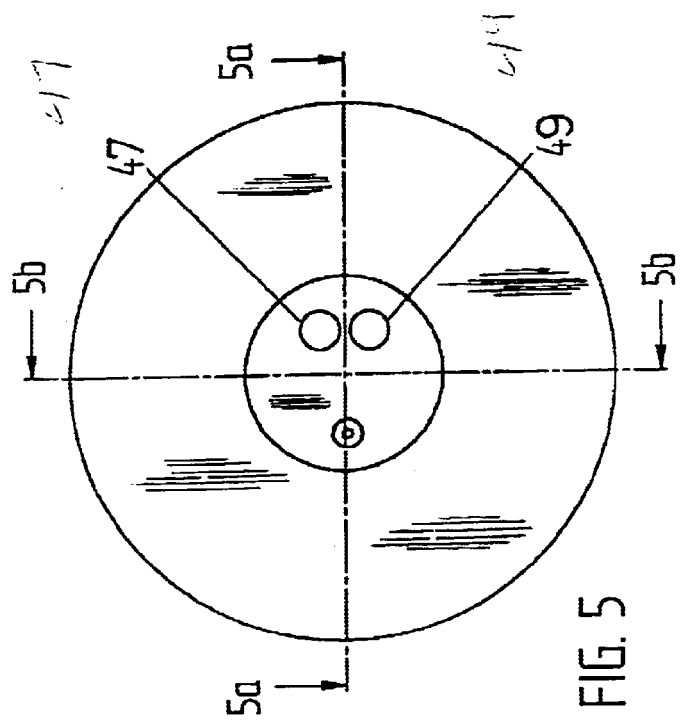
FIG. 5 is an end view of the rotor of the rotary power device of FIG. 2.
Figure 5A:
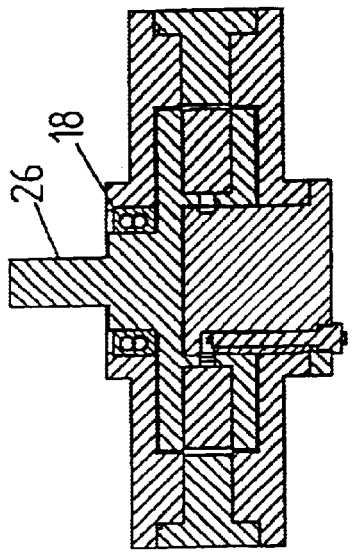
FIG. 5a is a sectional view taken along line 5a—5a of FIG. 5.
Figure 5B:
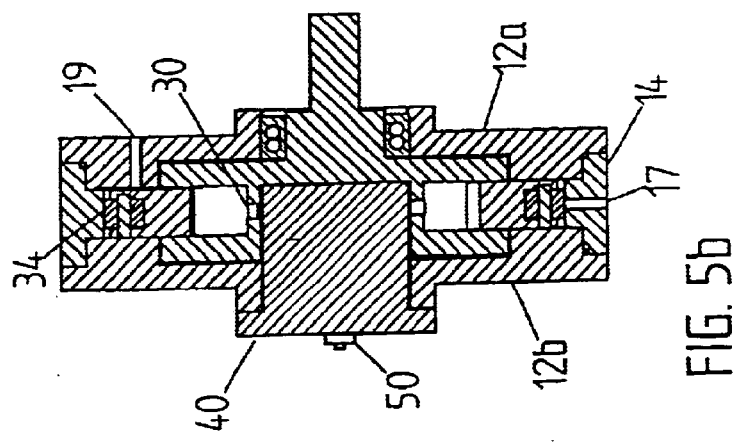
FIG. 5b is a sectional view taken along line 5b—5b of FIG. 5.

In the drawing the principles of this invention are illustrated through its application as a four-phase internal combustion engine generally equivalent to a conventional four-stroke spark ignition engine. It will be understood, however, that these principles can be successfully employed to other devices such as pumps, compressors, or fluid driven motors through a simple modification or replacement of the central stationary member.

Referring to FIG. 1 through FIG. 5b, one finds a depiction of a rotary power device 10 functioning as a four-phase internal combustion engine and comprising an external stator. The external stator, or housing, includes a tubular middle portion 14 having an elliptical cam track 15 within it. The middle portion 14 is affixed to front 12a and back 12b end plates by bolts or other suitable fixturing means known to those skilled in the mechanical arts (not shown). The front plate 12a comprises a central through opening 16a and bearing 18 within which an end shaft 26 extending outwardly from one end of the rotor 20 is journaled for rotation.

Those skilled in the mechanical arts will appreciate that one may choose to form the shaft integrally with the rotor, or may make it as a separate member that is then fixedly attached to the rotor. The back end plate 12b comprises a central opening 16b for receiving an internal stator 40 that extends along an axis of the device.

The central internal stator 40 comprises a cylindrical portion 42 protruding through the interior of the housing from the opening 16b in the end plate 12b and is fixedly attached to the end plate through the flange portion 44 by bolts or other suitable fixturing means (not shown). The internal stator comprises axially extending intake 47 and exhaust 49 channels, each of which is connected to a respective radially oriented intake 46 or exhaust 48 port. These ports are preferably configured as angularly adjacent slotted cutout openings, each of which is defined over a ninety degree angular extent. An ignition port 52 communicating with an ignition means 50 is preferably disposed approximately diametrically opposite to the lateral intake and exhaust ports.

In the tubular space between the central cylindrical internal stator 40 and the elliptical inner wall of the external stator, there is a cylindrical rotor assembly 20, which comprises a cylindrical block 22 having a central bore 24 and a plurality of compartments 28, each of which is open to the outer peripheral surface of the rotor. These compartments 28 are arranged to surround the bore equi-angularily, and are all disposed at the same radial distance from the axis of the shaft. Each compartment is shaped as a sector of a hollow cylinder that is closed at both ends and that has a respective pivot axis disposed near the outer edge of the block and parallel to the axis of rotation of the device. Each compartment communicates with the central bore through a respective inward opening 30. These inward openings are disposed in axial alignment with lateral ports formed in the internal stator. A preferred rotor includes an end shaft fixedly secured to one end of the rotor 26 and protruding through the central opening 16a in the end plate 12a Bearing means 18 in the end plate 12a rotatably carry the end shaft. A sector-shaped piston assembly 32 is preferably pivotally mounted within each compartment by means of the piston pinhole 38, rotor pinhole 36 and pin 37. The piston assemblies include cam followers 34 for constantly engaging the elliptical cam track 15 while executing a swinging movement about the pivot axis or pin 37. This results in the volume of the sector-shaped compartment varying as the rotor rotates.

Lubrication of the sliding piston surfaces may be performed by conveying a lubricating fluid, such as oil, through a port 19 in one end opening. The lubricating fluid may be withdrawn through a port 17 located at the lowest position of the cam track. The lubricating fluid may additionally serve as a coolant fluid, in which case the fluid withdrawn through the port 17 is preferably cooled by an external heat exchanger or other means (not shown) and then reconveyed to port 19 as part of an external lubrication loop (not shown).

In operation as a four-phase internal combustion engine, a starter motor (not shown) is connected to the shaft 26 to initiate the rotation of the rotor 20 and to thereby start the engine. A step by step explanation of the operation of the device is made with reference to FIG. 4b by tracing one piston and its respective volume changes as the rotor completes one revolution. The piston at the bottom of the figure is at its most outwardly extended position in which the volume of the compartment is a maximum value. This position corresponds to a bottom dead center (bdc) position in a conventional four-stroke engine. As the rotor rotates, the piston begins to swing inwardly, which decreases the compartment volume to a minimum at the end of the first ninety degrees of angular displacement. This point corresponds to the first top dead center (tdc) position in a conventional four-stroke device. At the same time, the inward opening 30 registers with an exhaust port 48b, thus performing an exhaust phase. In the second ninety degrees of angular displacement, the piston starts extending outward while the inward opening 30 registers with an intake port 48a, thus performing an intake phase. In the third ninety degrees of angular rotor displacement, the piston swings inwardly and gradually decreases the compartment to a minimum volume corresponding to the second (bdc) position. During the third ninety degrees of angular displacement the openings 30 are blocked by the wall portion 42 of the internal stator 40, thus performing a compression phase. At the beginning of the fourth ninety degrees of angular displacement, ignition of the compressed charge is initiated when the inward opening 30 of the compartment registers with an ignition cavity 52, which may contain a spark plug or other igniter. The expanding products of combustion exert a force on the outwardly swinging piston which reaches a maximum compartment volume position corresponding to the second (bdc) position. During this portion of the cycle, the wall portion 42 of the central internal stator blocks the inward opening 30, so that the device executes a power phase. In this power phase, the force of the expanding gases on the piston surface results in increasing the reaction force on the relatively inclined cam track, a component of which provides the necessary torque for rotation of the rotor. This reaction force is transmitted through the cam follower, the piston, the piston-pivoting pin 37, and rotor block 22. Thus, each rotor compartment 28 executes a four-phase cycle comprising an intake, compression, power and discharge as the rotor completes one single revolution.

Figure 6:
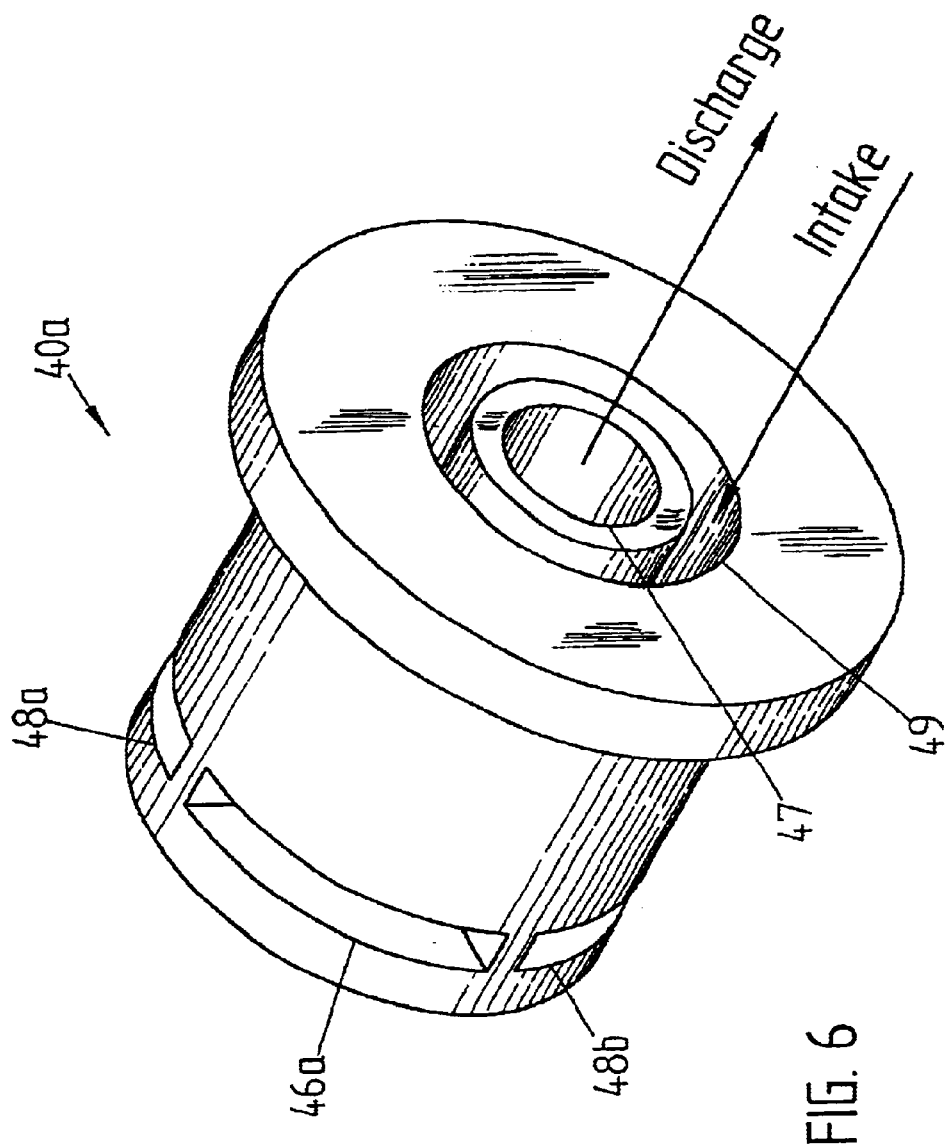
FIG. 6 is an isometric view of an alternative central internal stator of a rotary power device of the invention arranged to function as a pump, compressor, or fluid-driven motor.

The rotary power device 10 can be easily converted to serve a different function than that of an internal combustion engine by simply replacing the internal stator 40. A rotary power device employing the modified central internal stator 40a, shown in FIG. 6, can function as a compressor, pump, or a fluid-driven motor. In this configuration, the central internal stator may comprise two diametrically opposed intake ports 46a and 46b connected to a common central axial intake channel 47. Another pair of diametrically opposed discharge ports, 48a and 48b, may be connected to a common axial annular discharge channel 49. Each of the four ports is preferably defined over a ninety degree angular extension. Alternative arrangements (not shown) are possible in which the intake ports are connected to the annular channel 49 and the exhaust ports are connected to the central channel 47.

Figure 7A:
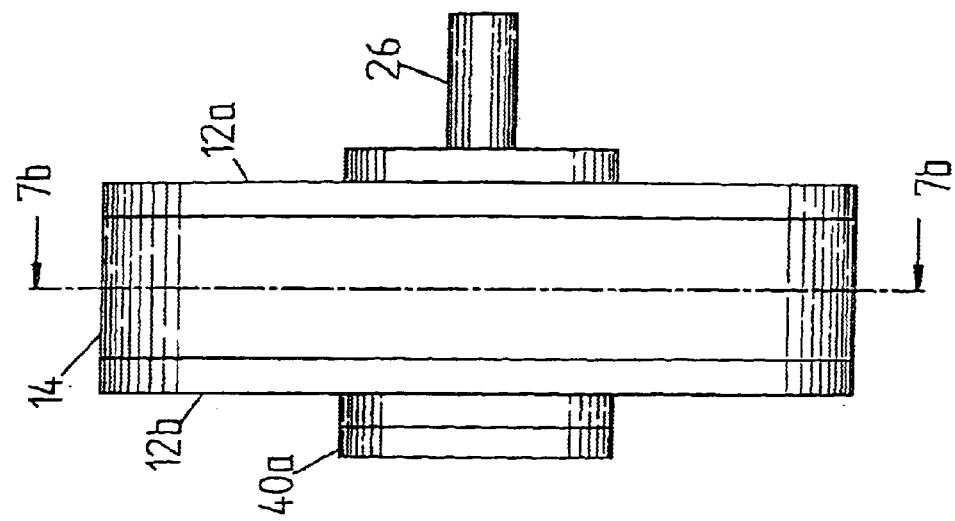
FIG. 7a is a side view of a rotary power device of the invention employing the internal stator of FIG. 6.
Figure 7B:
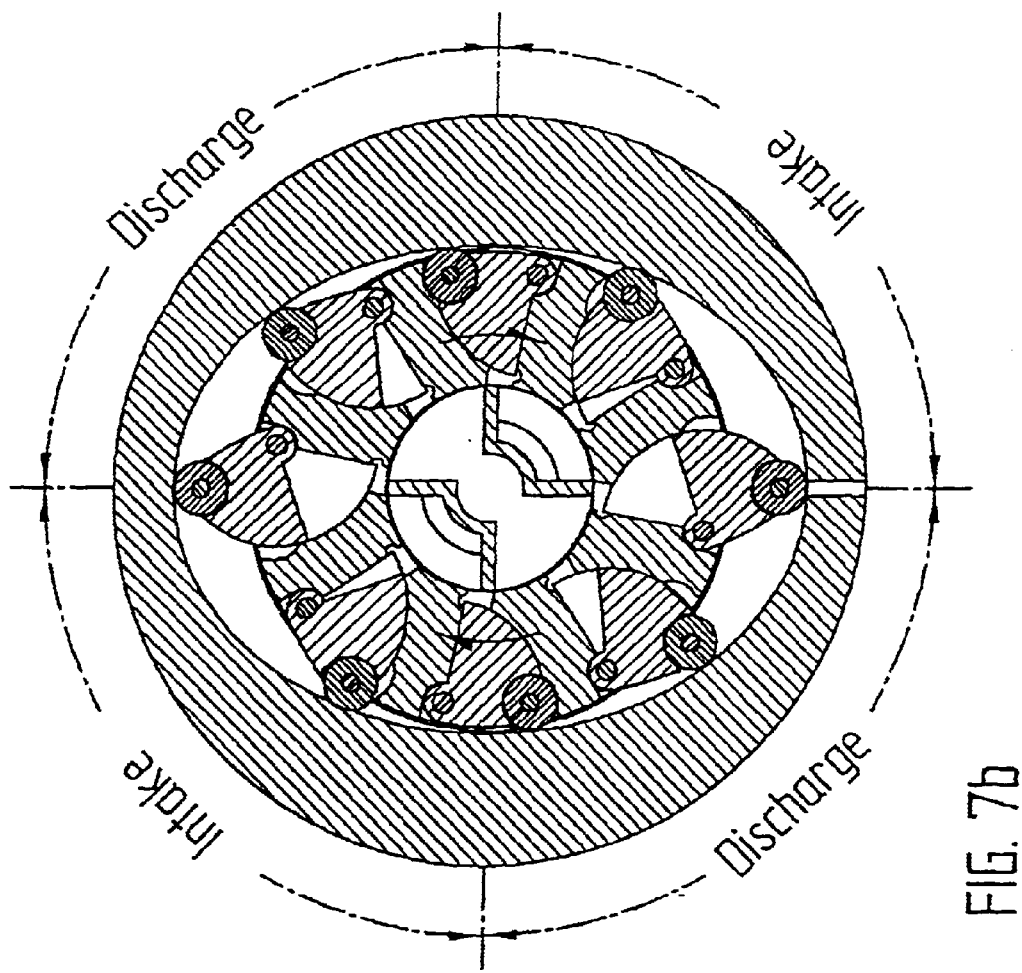

In operation as a pump or compressor, the rotor is made to rotate by coupling the end shaft 26 to a driving means, such as a motor. Referring to FIG. 7b, as the rotor completes one revolution, each rotor compartment performs two intake phases alternated by two discharge phases that are spread equally within 360 degree of angular displacement. In response to the action of centrifugal forces and the shape of the cam track, each piston angularly reciprocates within its respective rotor compartment so that the respective inner opening 30 alternatively registers with the intake and discharge ports 46a, 46b, 48a and 48b in the central internal stator 40a to perform intake and discharge functions. At any given instant, the rotor performs simultaneous diametrically opposed intake and diametrically opposed discharge phases divided equally among the rotor compartments.

In functioning as a fluid driven motor such as a hydraulic or pneumatic motor, a pressurized fluid source (not shown) is connected to the axial intake channels 47. The fluid pressure forces exerted on the piston surfaces during intake causes those pistons to swing outward. The reaction forces of the relatively inclined surface of the cam track on the piston assembly cam followers 34 of the diametrically opposed swinging pistons relative to the inclined cam track provides the necessary torque to cause rotation of the rotor. These reaction forces are transmitted through cam followers 34, pistons 32 and pin 37 At the same time, depressurized fluid is expelled from diametrically opposed rotor compartments as the pistons swing inwards with their inner openings 30 registering with discharge ports 48a and 48b of the central internal stator 40a.

Figures 9, 9S:
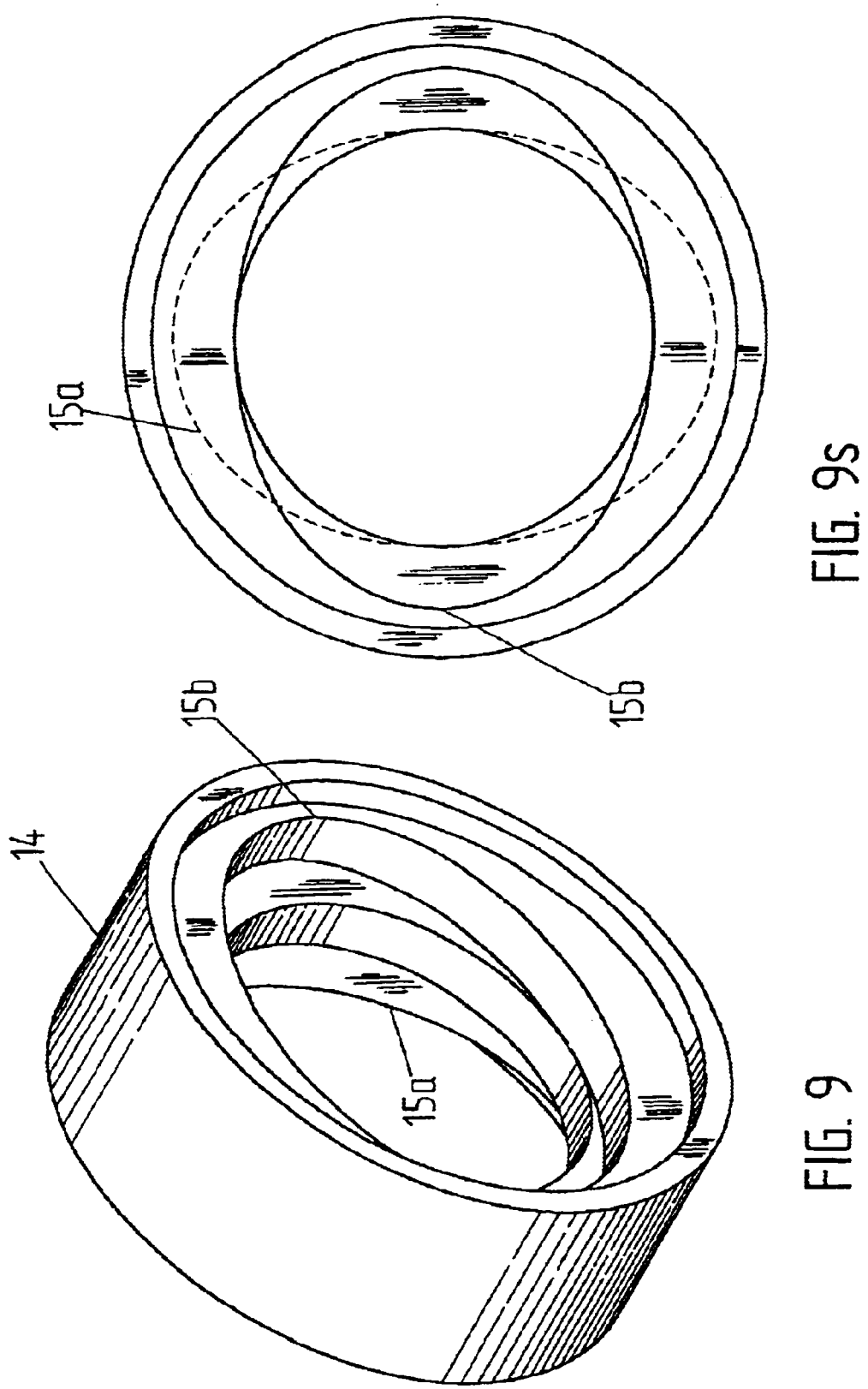
FIG. 9 is an isometric view of alternative cam arrangement for a rotary power device of the invention.
FIG. 9s is a side elevation view of FIG. 9.
Figure 10:
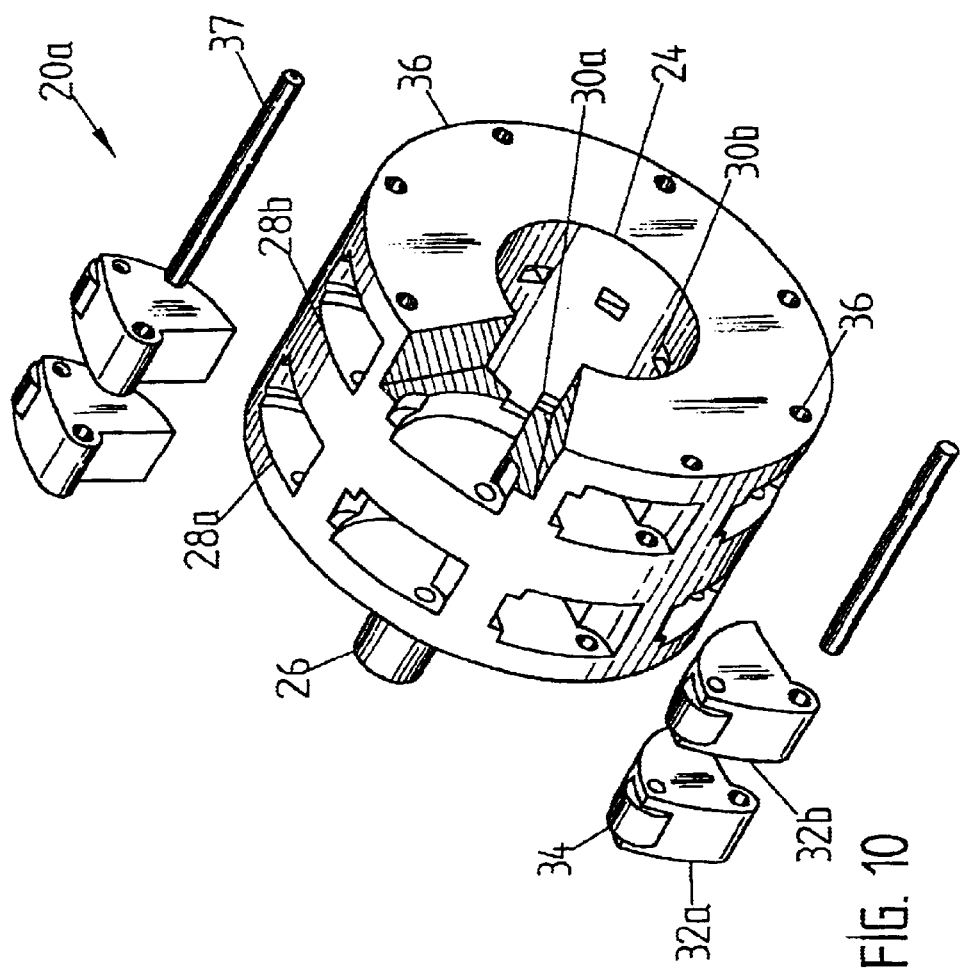
FIG. 10 is an exploded view of an alternative rotor-piston assembly of a rotary power device of the invention employing the alternative cam arrangement of FIG. 9.
Figure 11:
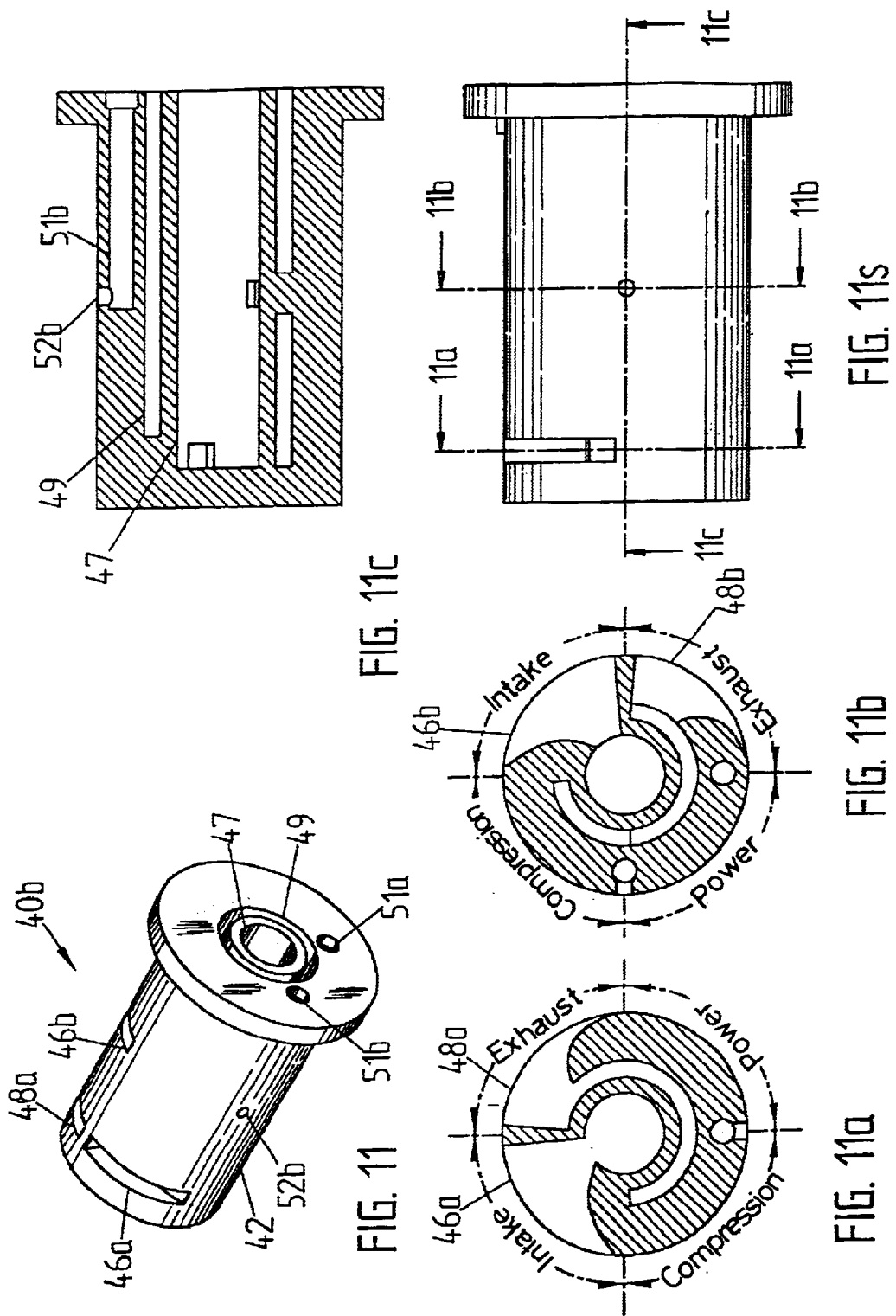
FIG. 11 is an isometric view of an alternative internal stator for a rotary power device of the invention that is operable as a four-phase internal combustion engine and that employs the alternative rotor-piston assembly of FIG. 10 and the alternative cam of FIG. 9.

Alternative embodiments of the rotary power device may comprise a selected number, greater than one, of cam tracks cooperating with a corresponding selected number of circular arrays of working compartments, where the arrays are spaced out along the axis of the device. For example, a device employing a double track cam is shown in FIG. 9 through FIG. 12, where FIG. 11 and FIG. 12 show two alternative internal stators for the double-track device. In general there is a ninety degree angular phase relation between any of the cam tracks and the one (if it is an end cam track) or two (if it is not) cam tracks that are immediately adjacent to it. For example, the double track cam comprises two identical oval shaped cam tracks 15a and 15b, each defining a ninety degree phase angle with respect to the other track as shown in FIG. 9s. The rotor-piston assembly shown in FIG. 10 comprises a pair of compartment arrays 28a and 28b, each of which receives a respective sector-shaped piston 32a and 32b and each of which has a respective inward opening 30a and 30b communicating with the central bore 24. Each array of pistons is disposed axially so as to engage the associated respective cam track as the rotor rotates.

A rotary power device employing the internal stator 40b of FIG. 11 operates as a four-phase internal combustion engine. The internal stator comprises a first pair of angularly adjacent intake 46a and discharge ports 48a, and a second pair 46b, 48b that is axially spaced apart from and rotated by ninety degree from the setting of the first pair. A first ignition port 52a is disposed diagonally opposite the first pair of intake and exhaust ports, and is connected to an ignition passage 51a adapted to receive a first spark plug. A second ignition port 52b is disposed diagonally opposite the second pair of intake and exhaust ports and is connected to an second ignition passage 51b adapted to receive a second spark plug. A central intake channel 47 communicates with each of the intake ports and an annular exhaust channel 49 communicates with each of the discharge ports. As shown in FIG. 11a and FIG. 11b, each array of compartments performs a simultaneous intake, compression, power and discharge phases divided equally among the compartments, so that each phase is defined within a ninety degree angular displacement The phases of one array are ninety degree out of phase with respect to the other array.

A rotary power device employing the internal stator 40c of FIG. 12 operates as one of a pump, compressor, expander and a fluid driven motor. The internal stator 40c comprises two sets of axially adjacent ports. A first set comprises a pair of diagonally opposed intake ports 46a and 46c alternated by another pair of diagonally opposed discharge ports 48a and 48c. The second set comprises a pair of diagonally opposed intake ports 46b and 46d alternated by another pair of diagonally opposed discharge ports 48b and 48d. All intake ports communicate with a common central intake channel 47 and all discharge ports communicate with a common annular discharge channel 49. As shown in FIG. 12a and FIG. 12b, each array of compartments simultaneously performs diagonally opposed intake and discharge phases.

As will be understood by those skilled in the art, various embodiments other than those described in detail in the specification are possible without departing from the scope of the invention will occur to those skilled in the art. It is, therefore, to be understood that the invention is to be limited only by the appended claims.

What is claimed is:

1. A pivoting piston rotary power device comprising a stator and a rotor, wherein the stator comprises:
   a tubular external stator portion defining an internal volume having an elliptical cross-section, the external stator portion comprising a tubular middle portion, a front end portion and a back end portion, the front end portion comprising a central throughhole, the tubular middle portion comprising at least one elliptical cam track disposed on an inner surface thereof; and
   an internal cylindrical stator portion projecting from the back end wall portion into the internal volume along an axis of the device, the internal stator portion having a plurality of passageways formed therein, each of the passageways comprising a channel parallel to the axis, each of the channels communicating with at least one respective radial port formed in a periphery of the internal stator; and
   wherein the rotor portion comprises:
      a shaft extending outwardly from a cylindrical block along the axis of the device, the shaft journaled within the central throughhole in the front end portion of the stator;
      the cylindrical block comprising a central cylindrical bore for receiving the internal stator, the block rotatable within that portion of the internal volume lying between the internal stator portion and the external stator portion, the block comprising at least one circular array of a selected number of working compartments equi-angularly spaced apart about the axis of the device, each working compartment defining a respective sector of a respective cylinder having a respective cylinder axis disposed parallel to the axis of the device, each compartment open to an outer surface of the block, each compartment further having a respective radially inwardly directed opening communicating with the central cylindrical bore; and
      a selected number of pivoting piston assemblies, each piston assembly received in a respective working compartment and having a respective pivot axis coinciding with the respective cylinder axis of the working compartment in which it is received, each piston assembly further comprising a roller cam follower for engaging the at least one elliptical cam track.

2. The pivoting piston rotary power device of claim 1 wherein
   the external stator comprises exactly one elliptical cam track and the cylindrical block comprises exactly one circular array of working compartments and
   the plurality of passageways comprises at least three passageways comprising:
      at least one inlet passageway comprising at least one radial inlet port communicating exactly once with each radial inward opening in the array of working compartments in the course of each rotation of the block;
      at least one exhaust passageway comprising at least one radial exhaust port communicating with each radial inward opening in the array of working compartments exactly once during each rotation of the block, and
      one ignition passageway for connecting each working compartment with an igniter, the ignition passageway comprising an ignition port communicating with each radial inward opening in the array of working compartments exactly once during each rotation of the block;
      whereby the pivoting piston rotary power device is adapted to function as a four-phase internal combustion engine.

3. The pivoting piston rotary power device of claim 2 wherein the number of passageways comprises one intake passageway and one exhaust passageway, one of the intake and exhaust passageways comprising an axial channel, the other of the intake and the exhaust passageways comprising an annular channel disposed about the axial channel.

4. The pivoting piston rotary power device of claim 1 wherein
   the external stator comprises one elliptical cam track and the cylindrical block comprises one circular array of working compartments;
   the plurality of passageways comprises at least two passageways comprising:
      an inlet passageway comprising first and second diagonally opposed radial inlet ports, each of the first and second inlet ports communicating with the respective radially inwardly directed opening in each working compartment exactly once during each rotation of the block,
      an exhaust passageway comprising first and second diagonally opposed radial exhaust ports, each of the first and second exhaust ports communicating with the respective radially inwardly directed opening in each working compartment exactly once during each rotation of the block,
      whereby the pivoting piston rotary power device is adapted to function as one of a pump, a compressor, a fluid-driven motor and an expander device.

5. The pivoting piston rotary power device of claim 4 wherein the number of passageways comprises one intake passageway and one exhaust passageway, one of the intake and exhaust passageways comprising an axial channel, the other of the intake and the exhaust passageways comprising an annular channel disposed about the axial channel.

6. The axial piston rotary power device of claim 1 wherein
   the tubular middle portion comprises a selected number, greater than one, of elliptical cam tracks spaced apart along the axis of the device and the cylindrical block comprises the selected number of circular arrays of working compartments, each array of working compartments axially aligned with a respective cam track; and
   the plurality of passageways comprises at least four passageways comprising
      an inlet passageway comprising at least the selected number of radial inlet ports, each of the radial inlet ports associated with a respective array of working compartments, each radial inlet port communicating with each radially inwardly directed opening of the respective array of compartments with which it is associated exactly once during each rotation of the block;
      an exhaust passageway comprising at least the selected number of radial exhaust ports, each of the radial exhaust ports associated with a respective array of working compartments, each radial exhaust port communicating with each radially inwardly directed opening of the respective array of compartments with which it is associated exactly once during each rotation of the block; and the selected number of ignition passageways, each of the ignition passageways associated with a respective array of working compartments, each of the ignition passageways comprising a respective ignition port communicating with each radially inwardly directed opening of the array of working compartments with which it is associated exactly once during each rotation of the block;

whereby the pivoting piston rotary power device is adapted to function as a four-phase internal combustion engine.

7. The pivoting piston rotary power device of claim 6 wherein the selected number is two and the passageways comprise a single intake passageway and a single exhaust passageway, one of the intake and exhaust passageways comprising an axial channel, the other of the intake and the exhaust passageways comprising an annular channel disposed about the axial channel.

8. The pivoting piston rotary power device of claim 6 wherein the selected number is two and wherein each of the two ignition ports is disposed approximately diametrically opposed to the respective inlet and exhaust ports, and wherein each ignition port is disposed at a ninety degree angular displacement with respect to the other ignition port.

9. The pivoting piston rotary power device of claim 6 wherein the selected number is two and a first of the two elliptical cam tracks is disposed at a ninety angular phase relationship with respect to the other cam track.

10. The pivoting piston rotary power device of claim 1 wherein the tubular external stator portion comprises a selected number, greater than one, of elliptical cam tracks spaced apart along the axis of the device and the cylindrical block comprises the selected number of circular arrays of working compartments, each array axially aligned with a respective cam track; and the plurality of passageways comprises at least two passageways comprising an inlet passageway comprising at least the selected number of pairs of diagonally opposed radial inlet ports, each pair of the inlet ports associated with a respective array of working compartments, each of the inlet ports communicating with each radially inwardly directed opening in the array of working compartments with which it is associated exactly once during each rotation of the block; and an exhaust passageway comprising at least the selected number of pairs of diagonally opposed radial exhaust ports, each pair of the exhaust ports associated with a respective array of working compartments, each exhaust port communicating with each radially inwardly directed opening in the array of working compartments with which it is associated exactly once during each rotation of the block;

whereby the pivoting piston rotary power device is adapted to function as one of a pump, a compressor, a fluid-driven motor and an expander device.

11. The pivoting piston rotary power device of claim 10 wherein one of the intake and exhaust passageways comprises an axial channel and the other of the intake and exhaust passageways comprises an annular channel disposed about the axial channel.

12. The pivoting piston rotary power device of claim 10 wherein there is a 90 degree angular phase relationship between any two immediately adjacent ones of the selected number of cam tracks.

13. The pivoting piston rotary power device of claim 1 wherein the external stator comprises means for supplying lubricant to the cam track surface and means for withdrawing said lubricant.

14. The pivoting piston rotary power device of claim 1 wherein the pivoting piston assembly comprises a predominantly sector-shaped portion of a circular cylinder.

15. The pivoting piston rotary power device of claim 1 wherein the elliptical cam track has a center point coinciding with the axis of the shaft.

16. An internal combustion engine having an output shaft extending outwardly from a cylindrical block rotatable about an axis of the shaft, the block received within an external stator having a tubular portion comprising at least one elliptical cam track, the cylindrical block comprising:

a central cylindrical bore extending through the block along the axis of the shaft;

at least one circular array of a predetermined number of working compartments disposed at a single radial distance from the axis of the shaft, each compartment forming a sector of a cylinder having a respective cylindrical axis parallel to the axis of the shaft, each working compartment open to a peripheral surface of the block, each working compartment further having a respective radially inwardly directed opening communicating with the central bore;

a predetermined number of piston assemblies, each piston assembly movable within a respective working compartment, each piston assembly having at least one cylindrical wall portion, each piston assembly comprising a pivot pin having an axis coincident with the cylindrical axis of the respective working compartment, each piston assembly further comprising a roller cam follower;

the engine further comprising an internal stator portion received in the cylindrical bore of the block, the internal stator portion having a plurality of passageways formed therein, each of the passageways comprising a respective channel predominantly parallel to the axis of the shaft, each of the channels communicating with at least one respective radial port in the internal stator, each radial port communicating with the radially inwardly directed opening of each working compartment exactly once during each rotation of the block, at least one of the plurality of passageways comprising an inlet passageway, at least one of the plurality of passageways comprising an exhaust passageway, and at least one of the passageways comprising an ignition passageway for connecting an igniter to each of the working compartments.

17. A pivoting piston rotary device operable as one of a compressor and a pump, the device having an input shaft extending outward from an end of a cylindrical block rotatable about an axis of the shaft and received within an external stator having a tubular wall portion comprising at least one elliptical cam track, wherein the cylindrical block comprises:

a central cylindrical bore extending through the block along the axis of the shaft;

at least one circular array of a predetermined number of working compartments disposed at a single radial distance from the axis of the shaft, each compartment forming a sector of a respective cylinder having a respective cylinder axis parallel to the axis of the shaft, each working compartment open to an outer peripheral surface of the block, each working compartment further having a respective radially inwardly directed opening communicating with the central bore;

the device further comprising:

a predetermined number of piston assemblies, each piston assembly associated with a respective working compartment, each piston assembly comprising at least one cylindrical wall portion, each piston assembly comprising a respective pivot pin having an axis coincident with the respective cylinder axis of the respective working compartment, each piston assembly further comprising a respective roller cam follower for following the at least one cam track and for executing angular reciprocating movement when the block rotates; and an internal stator portion received in the cylindrical bore of the block, the internal stator portion having a plurality of passageways formed therein, each of the passageways comprising a respective channel predominantly parallel to the axis of the shaft, each of the channels communicating with at least one respective radial port in the internal stator, each of the radial ports communicating with each of the radially inwardly directed openings exactly once during each rotation of the block, at least one of the plurality of passageway comprising an inlet passageway and at least one of the plurality of passageways comprising an exhaust passageway.

18. A pivoting piston rotary device operable as one of a fluid-driven motor and a fluid expander, the device having an output shaft extending outwardly from an end of a cylindrical block rotatable about an axis of the shaft and received within an external stator having a tubular portion comprising at least one elliptical cam track, wherein the cylindrical block comprises:

a central cylindrical bore extending through the block along the axis of the shaft; and at least one circular array of a predetermined number of working compartments disposed at a single radial distance from the axis of the shaft, each compartment forming a sector of a respective hollow cylinder having a respective cylinder axis parallel to the axis of the shaft, each working compartment open to a peripheral surface of the block, each working compartment comprising a radially inwardly directed opening communicating with the central bore;

the device further comprising:

a predetermined number of piston assemblies, each piston movable within a respective working compartment, each piston assembly comprising at least one cylindrical wall portion, each piston assembly comprising a respective pivot pin having a respective axis coinciding with the cylinder axis of the respective working compartment, each piston assembly further having a roller cam follower for following the cam track and for executing angular reciprocating movement as the block rotates; and an internal stator portion received in the cylindrical bore of the cylindrical block, the internal stator portion having a plurality of passageways formed therein, each of the passageways comprising a channel predominantly parallel to the axis of the shaft, each of the channels communicating with at least one respective radial port in the internal stator, each radial port communicating with the radially inwardly directed opening in each working compartment exactly once during each rotation of the block, at least one of the plurality of passageway comprising an inlet passageway, and at least one of the plurality of passageways comprising an exhaust passageway.

* * * * *